US012799388B2

(12) United States Patent
Fan et al.

(10) Patent No.: US 12,799,388 B2
(45) Date of Patent: Nov. 17, 2026

(54) METHODS FOR CONSTRUCTING FLUORINE-CONTAINING PASSIVATION LAYERS FOR PEROVSKITE QUANTUM DOTS

(71) Applicant: WENZHOU XINXINTAIJING TECH. CO., LTD., Wenzhou (CN)

(72) Inventors: Chao Fan, Wenzhou (CN); Xingliang Dai, Wenzhou (CN); Haiping He, Wenzhou (CN); Zhizhen Ye, Wenzhou (CN)

(73) Assignee: WENZHOU XINXINTAIJING TECH. CO., LTD., Wenzhou (CN)

( * ) Notice: Subject to any disclaimer, the term of this patent is extended or adjusted under 35 U.S.C. 154(b) by 322 days.

(21) Appl. No.: 18/767,966

(22) Filed: Jul. 9, 2024

(65) Prior Publication Data

US 2025/0243403 A1 Jul. 31, 2025

(30) Foreign Application Priority Data

Jan. 30, 2024 (CN) ......................... 202410126814.3

(51) Int. Cl.
*C09K 11/02* (2006.01)
*B82Y 20/00* (2011.01)
(Continued)

(52) U.S. Cl.
CPC ............ *C09K 11/025* (2013.01); *B82Y 20/00* (2013.01); *B82Y 40/00* (2013.01); *C09K 11/665* (2013.01)

(58) Field of Classification Search
CPC ..... C09K 11/025; C09K 11/665; C09K 11/02; C09K 11/616; B82Y 20/00; B82Y 40/00; B82Y 30/00
See application file for complete search history.

(56) References Cited

U.S. PATENT DOCUMENTS

2021/0292642 A1* 9/2021 Li .......................... C09K 11/02
2022/0195290 A1* 6/2022 Aoki ...................... C09K 11/08
(Continued)

FOREIGN PATENT DOCUMENTS

CN 110734758 A 1/2020
CN 114316969 A 4/2022
(Continued)

OTHER PUBLICATIONS

First Office Action in Chinese Application No. 202410126814.3 mailed on Mar. 18, 2026, 14 pages.
(Continued)

*Primary Examiner* — Andrew J. Oyer
(74) *Attorney, Agent, or Firm* — PORUS IP LLC

(57) ABSTRACT

The present disclosure provides a method for constructing a fluorine-containing passivation layer for perovskite quantum dots, and the fluorine-containing passivation layer comprising a microporous/mesoporous template with incompletely closed pores, within which perovskite nanocrystals and a fluorine-containing passivation layer are grown. The fluorine-containing passivation layer is used to passivate surface defects of the perovskite nanocrystals; the fluorine-containing passivation layer includes $BaF_2$. The present disclosure allows for the passivation of the surface of perovskite nanocrystals to improve stability without collapsing the microporous/mesoporous template.

18 Claims, 4 Drawing Sheets

100

(51) Int. Cl.
*B82Y 40/00* (2011.01)
*C09K 11/66* (2006.01)

(56) References Cited

U.S. PATENT DOCUMENTS

| | | | |
|---|---|---|---|
| 2024/0035194 | A1 | 2/2024 | Fan et al. |
| 2024/0392188 | A1 | 11/2024 | Fan et al. |

FOREIGN PATENT DOCUMENTS

| | | | |
|---|---|---|---|
| CN | 115772401 | A | 3/2023 |
| CN | 119552648 | A | 3/2025 |
| WO | 2022024037 | A1 | 2/2022 |

OTHER PUBLICATIONS

The Extended European Search Report in European Application No. 24184944.7 mailed on Dec. 5, 2024, 7 pages.

Wei, Yi et al., Highly Luminescent Lead Halide Perovskite Quantum Dots in Hierarchical CaF 2 Matrices with Enhanced Stability as Phosphors for White Light-Emitting Diodes, Advanced Optical Materials, 6(11): 1-8, 2018.

* cited by examiner

METHODS FOR CONSTRUCTING FLUORINE-CONTAINING PASSIVATION LAYERS FOR PEROVSKITE QUANTUM DOTS

CROSS-REFERENCE TO RELATED APPLICATIONS

This application claims priority to Chinese Patent Application No. CN 202410126814.3, filed on Jan. 30, 2024, the entire contents of which are hereby incorporated by reference.

TECHNICAL FIELD

The present disclosure relates to the technical field of perovskite quantum dots, and specifically relates to a method for constructing a fluorine-containing passivation layer for perovskite quantum dots and the fluorine-containing passivation layer.

BACKGROUND

Lead halide compounds with a perovskite structure represent an emerging class of semiconductor materials. In particular, all-inorganic perovskites such as CsPbX3 (X=Br, Cl, I) exhibit high fluorescence quantum yield, narrow full width at half maximum, and tunable emission wavelength, making them of great research and application value in lighting and display devices. However, due to their ionic nature and soft lattice characteristics, lead halide perovskites are prone to structural damage in environments such as high temperature, humidity, and strong light exposure, resulting in decreased luminescent performance. This limitation hinders the practical luminescent applications of perovskite materials. For example, although spontaneously formed lead hydroxide coatings such as PbBrOH on perovskite nanocrystals in water provide good water and oxygen barrier properties, their chemical stability decreases at temperatures above 70 degrees Celsius, leading to the destruction of the passivation layer and a significant decrease in nanocrystal luminescence efficiency.

Encapsulating perovskite nanocrystals in coating materials can effectively enhance their stability. For instance, using materials such as mesoporous silica or molecular sieves, which tend to collapse at high temperatures, as encapsulation structures for perovskite nanocrystals, can effectively isolate the perovskites from the external environment, ensuring stable luminescence of the nanocrystals in water or high humidity air.

However, these coating structures often fail to effectively passivate the surface of the perovskite nanocrystals, resulting in a large number of surface defects. These defects may cause a decrease in the fluorescence intensity of the perovskite nanocrystals under high temperature or light exposure, highlighting the need for improvement.

SUMMARY

The purpose of the present disclosure is to provide a method for constructing a fluorine-containing passivation layer for perovskite quantum dots. To achieve the purpose, the technical solution adopted in the present disclosure is as follows:

One embodiment of the present disclosure provides a perovskite quantum dot with a fluorine-containing passivation layer, comprising an incompletely closed microporous/mesoporous template, with perovskite nanocrystals and a fluorine-containing passivation layer growing in pores of the microporous/mesoporous template, the fluorine-containing passivation layer being used to passivate surface defects of the perovskite nanocrystals; wherein the fluorine-containing passivation layer includes $BaF_2$.

One embodiment of the present disclosure provides a method for constructing a fluorine-containing passivation layer for perovskite quantum dots, comprising: growing perovskite nanocrystals containing barium within pores of a microporous/mesoporous template, wherein the microporous/mesoporous template is not fully pore-closed; soaking the microporous/mesoporous template grown with the perovskite nanocrystals containing barium in water to form a lead hydroxide coating on the surface of the perovskite nanocrystals containing barium; introducing F ions into the pores of the microporous/mesoporous template to enrich the F ions within the pores, wherein the lead hydroxide coating blocks contact between the F ions and the perovskite nanocrystals containing barium; placing the microporous/mesoporous template containing the perovskite nanocrystals with barium, the lead hydroxide coating, and the enriched F ions under a hydrothermal reaction condition; during the hydrothermal reaction, the lead hydroxide coating disappears and a fluorine-containing passivation layer is formed on the surface of the perovskite nanocrystals, the fluorine-containing passivation layer including $BaF_2$.

BRIEF DESCRIPTION OF THE DRAWINGS

This description will be further explained in the form of exemplary embodiments, which will be described in detail by means of accompanying drawings. These embodiments are not restrictive, in which the same numbering indicates the same structure, wherein.

DETAILED DESCRIPTION

Figure 1:
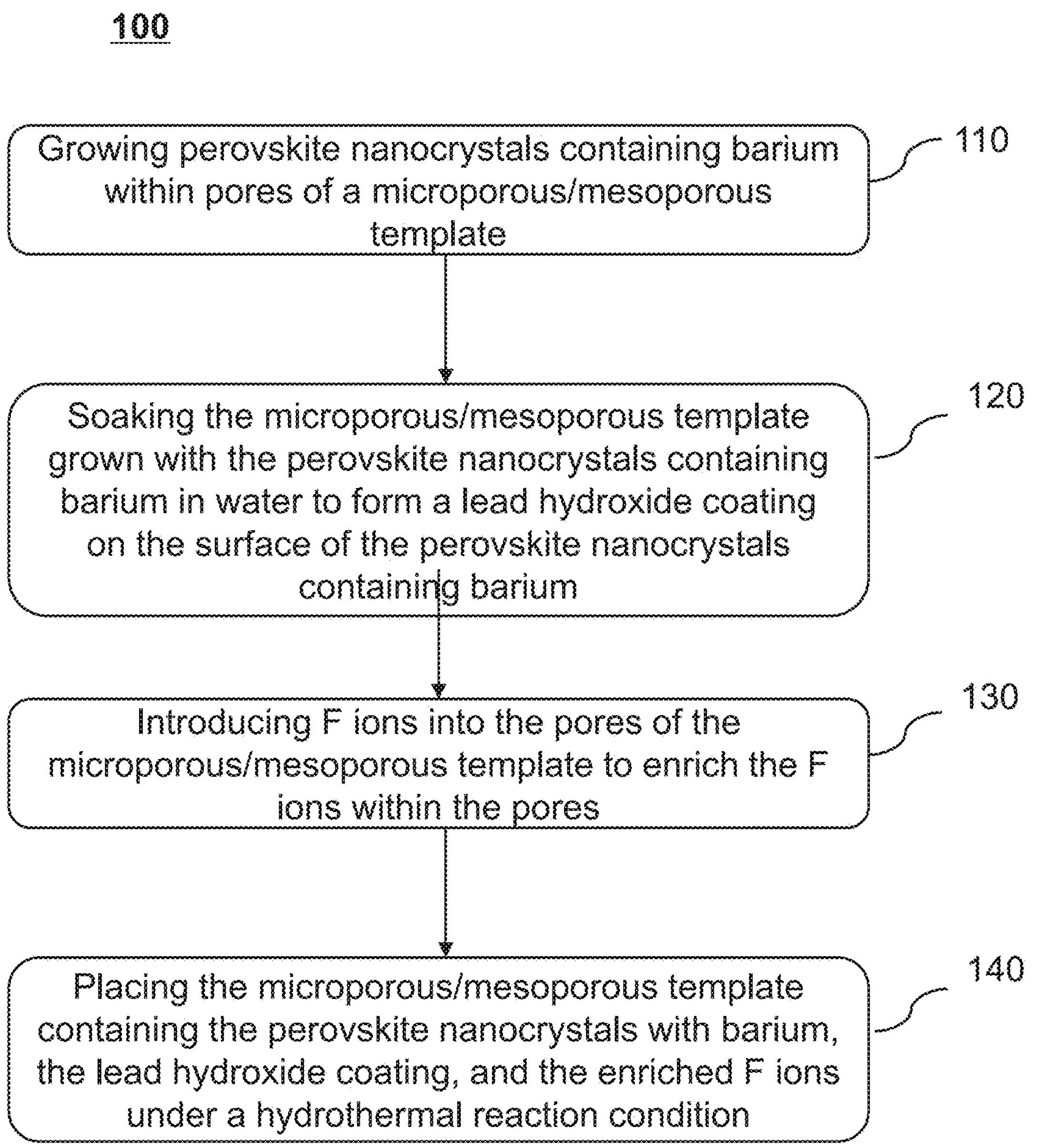
FIG. 1 is an exemplary flowchart illustrating a method for constructing a fluorine-containing passivation layer for perovskite quantum dots according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

Unless the context clearly indicates exceptions, words such as “a”, “an”, “one”, and/or “the” do not specifically refer to the singular, but may also include the plural. Generally speaking, the terms “including” and “comprising” only suggest the inclusion of clearly identified steps and elements, and these steps and elements do not constitute an exclusive list. The method or device may also include other steps or elements.

To make the purpose, technical solution, and effect of the present disclosure clearer and more explicit, the following provides further detailed explanations of the present disclosure. It should be understood that the specific embodiments described here are only used to explain the present disclosure and are not intended to limit it.

One embodiment of the present disclosure provides a perovskite quantum dot with a fluorine-containing passivation layer, comprising an incompletely closed microporous/mesoporous template, with perovskite nanocrystals and a fluorine-containing passivation layer growing in pores of the microporous/mesoporous template, the fluorine-containing passivation layer being used to passivate surface defects of the perovskite nanocrystals; wherein the fluorine-containing passivation layer includes $BaF_2$.

In some embodiments, the fluorine-containing passivation layer includes $BaF_2$ and other metal fluorides.

In some embodiments, the other metal fluorides refer to metal fluorides other than $BaF_2$. For example, the other metal fluorides include at least one of $NaK_2AlF_6$, $SrF_2$, and $CaF_2$.

In some embodiments, when the microporous/mesoporous template is MCM-41, the fluorine-containing passivation layer includes BaF2 and $NaK_2AlF_6$. More description about MCM-41 may be found in the following sections.

In some embodiments, the microporous/mesoporous template is a microporous material and/or a mesoporous material, etc.

In some embodiments, the microporous material is at least one of microporous molecular sieve, microporous silica, microporous titanium dioxide, microporous alumina, microporous transition metal oxide, microporous sulfide, microporous silicate, microporous aluminate, or microporous transition metal nitride.

In some embodiments, the mesoporous material is at least one of mesoporous molecular sieve, mesoporous silica, mesoporous titanium dioxide, mesoporous alumina, mesoporous carbon, mesoporous transition metal oxide, mesoporous sulfide, mesoporous silicate, mesoporous aluminate, or mesoporous transition metal nitride.

In some embodiments, the perovskite nanocrystals have a perovskite structure $ABX_3$, wherein a molar ratio of A, B, and X is 1:1:3, and A is Cs, B is Pb, Sn, or Cu, and X is Cl, Br, or I.

In some embodiments, the perovskite nanocrystals have a perovskite structure $ABX_{1.5}X'_{1.5}$, wherein a molar ratio of A, B, X, and X' is 1:1:1.5:1.5, and A is Cs, B is Pb, Sn, or Cu, and X and X' are different and independently Cl, Br, or I.

In some embodiments, the perovskite nanocrystals have a perovskite structure that may also be represented as ABXyX'3-y, where a molar ratio of A, B, X, and X' is 1:1:y:3-y, with y taking any value between 0 and 1.5. A represents Cs, B represents Pb, Sn, or Cu, and X and X' are different and independently represent Cl, Br, or I.

In some embodiments, a melting point of the fluorine-containing passivation layer is higher than that of the perovskite nanocrystals.

In some embodiments of the present disclosure, since the melting point of the fluorine-containing passivation layer is higher than that of the perovskite nanocrystals, BaF2 has a higher lattice energy compared to the perovskite nanocrystals, making its structure stable and difficult to be destroyed. When BaF2 adheres to an inner wall of the micro/mesoporous template, it acts as a reinforcing rib for the microporous/mesoporous template, thereby improving its structural strength and facilitating subsequent production and processing.

In some embodiments, there is a passivation interface between the fluorine-containing passivation layer and the perovskite nanocrystals, which reduces the surface defect density of the perovskite nanocrystals.

The passivation interface refers to an interface that exists due to differences in grain orientation and structural composition between the passivation layer and the perovskite nanocrystals. In some embodiments, the passivation interface is formed based on the interaction between the surface defects of the passivation layer and the perovskite nanocrystals.

In some embodiments, the perovskite nanocrystals are embedded in the lattice of the fluorine-containing passivation layer. Alternatively, some of the perovskite nanocrystals are coated by the fluorine-containing passivation layer. If some of the perovskite nanocrystals are coated by the fluorine-containing passivation layer, it is equivalent to having more passivation interfaces between the fluorine-containing passivation layer and the perovskite nanocrystals, resulting in a better passivation effect on the perovskite nanocrystals.

FIG. 1 is an exemplary flowchart illustrating a method for constructing a fluorine-containing passivation layer for perovskite quantum dots according to some embodiments of the present disclosure. As shown in FIG. 1, the process 100 includes the following steps.

Step 110, growing perovskite nanocrystals containing barium within pores of a microporous/mesoporous template.

In some embodiments, the microporous/mesoporous template is not completely closed.

The incompletely closed microporous/mesoporous template refers to a template whose pore channels are not fully sealed, which may be used to prepare materials with specific pore structures. The pore structures may be set according to actual needs, for example, being set at the nanoscale.

In some embodiments, the microporous/mesoporous template includes multiple micropores and mesopores. The micropores refer to pores with diameters within a first preset range. The first preset range may be preset according to actual needs, for example, a range of 1 nanometer to 2 nanometers. The mesopores refer to pores with diameters within a second preset range. The second preset range may also be set according to actual needs, for example, a range of 20 nanometers to 50 nanometers.

In some embodiments, the microporous/mesoporous template may be made of organic or inorganic materials.

In some embodiments, the microporous/mesoporous template with incompletely closed pores may be prepared through various methods. For example, hard templating, soft templating, self-assembly templating, exfoliation templating, self-assembly plasma etching, etc.

Step 130, soaking the microporous/mesoporous template grown with the perovskite nanocrystals containing barium in water to form a lead hydroxide coating on the surface of the perovskite nanocrystals containing barium.

In some embodiments, the microporous/mesoporous template grown with the perovskite nanocrystals containing barium may be soaked in water manually or through a soaking device.

In some embodiments, the perovskite nanocrystals are a type of soft lattice ionic compound that decomposes into cesium halide and lead halide when exposed to water. The lead halide further reacts with water to form a lead hydroxide, PbXOH (where X is a halogen element). Due to the low solubility of the lead hydroxide, it may adhere to the surface of the undecomposed perovskite nanocrystals, forming a lead hydroxide coating.

Step 140, introducing F ions into the pores of the microporous/mesoporous template to enrich the F ions within the pores.

In some embodiments, the F ions may be introduced into the pores of the microporous/mesoporous template manually or through an introduction device.

In some embodiments, the lead hydroxide coating can prevent direct contact between the F ions and the perovskite nanocrystals containing barium.

Step 150, placing the microporous/mesoporous template containing the perovskite nanocrystals with barium, the lead hydroxide coating, and the enriched F ions under a hydrothermal reaction condition.

In some embodiments, the microporous/mesoporous template containing the perovskite nanocrystals with barium, the lead hydroxide coating, and enriched F ions may be placed under hydrothermal reaction manually or through a hydrothermal reaction device.

In some embodiments, during the hydrothermal reaction, the lead hydroxide coating disappears, and the fluorine-containing passivation layer forms on the surface of the perovskite nanocrystals, including $BaF_2$.

The fluorine-containing passivation layer refers to a dense fluoride film. In some embodiments, passivation is achieved by forming the fluorine-containing passivation layer on the surface of the perovskite nanocrystals.

In some embodiments, the fluorine-containing passivation layer may also include other metal fluorides, which may serve as characteristic identification phases for constructing the fluorine-containing passivation layer of perovskite quantum dots through hydrothermal reaction.

In some embodiments, due to the low melting point of lead hydroxide, it is easily decomposed at temperatures higher than the hydrothermal reaction temperature specified in the present disclosure. In particular, it is prone to decomposition at temperatures above 100 degrees Celsius, so during the hydrothermal process, the high-temperature lead hydroxide gradually decomposes and disappears.

In some embodiments, the aforementioned Process 100 may be executed through a device for constructing a fluorine-containing passivation layer for perovskite quantum dots. The construction device refers to a device used to build a fluorine-containing passivation layer for perovskite quantum dots. The construction device may include multiple sub-devices (such as a preparation device, a soaking device, an introduction device, a hydrothermal reaction device, etc.), and different sub-devices may be used to perform the aforementioned different steps.

One embodiment of the present disclosure provides a method for constructing a fluorine-containing passivation layer for perovskite quantum dots, including an incompletely closed microporous/mesoporous template. Pores of the microporous/mesoporous template have perovskite nanocrystals containing barium grown within them. After soaking the perovskite nanocrystals in water, a lead hydroxide coating forms on the surface of the perovskite nanocrystals. The method also includes F ions enriched within the pores of the microporous/mesoporous template. The lead hydroxide coating blocks contact between the F ions and the perovskite nanocrystals containing barium. From another perspective: the lead hydroxide coating is located between the F ions and the perovskite nanocrystals containing barium, blocking contact between the F ions and the perovskite nanocrystals containing barium. Under hydrothermal reaction, the lead hydroxide coating disappears, and a $BaF_2$ passivation layer forms on the surface of the perovskite nanocrystals.

In some embodiments, the hydrothermal reaction refers to a process where substances react under high temperature and high-pressure water environments.

In the present disclosure, high-temperature and high-pressure hydrothermal conditions facilitate the bonding of strongly negatively charged fluoride ions and strongly positively charged barium ions. A pressure range of the hydrothermal reaction may be between 1 and 100 MPa. A temperature of the hydrothermal reaction may be more than 70° C., and a reaction time may be at least 1 hour. In some embodiments, the pressure range, the temperature, and the reaction time of the hydrothermal reaction may also have other values and may be set according to actual needs.

In some embodiments, the lead hydroxide coating and the fluorine-containing passivation layer may appear alternately. In some embodiments, the disappearance of the lead hydroxide coating and the emergence of the fluorine-containing passivation layer may occur simultaneously. From a temporal perspective, the lead hydroxide coating and the fluorine-containing passivation layer appear sequentially.

In some embodiments, when the fluorine-containing passivation layer includes $BaF_2$ and other metal fluorides, these other metal fluorides serve as characteristic identification phases for constructing the fluorine-containing passivation layer of perovskite quantum dots through the hydrothermal reaction. For example, the other metal fluorides may be $NaK_2AlF_6$ as a characteristic identification phase.

In some embodiments, when the microporous/mesoporous template is MCM-41, the fluorine-containing passivation layer includes $BaF_2$ and $NaK_2AlF_6$, and $NaK_2AlF_6$ serves as a characteristic identification phase for constructing the fluorine-containing passivation layer of perovskite quantum dots through the hydrothermal reaction.

By adopting the above scheme: Firstly, metal barium doping or surface modification is performed on the perovskite nanocrystals to obtain perovskite nanocrystals with barium elements on their surface. Fluoride ions enter the pores of the microporous/mesoporous template and react with barium to form $BaF_2$, which is located on the surface of the perovskite nanocrystals to passivate them.

In some embodiments, the microporous/mesoporous template may be doped or modified with other metals. The fluorine-containing passivation layer formed in the present disclosure may include $BaF_2$ and other metal fluorides. For example, the fluorine-containing passivation layer includes $BaF_2$ and $NaK_2AlF_6$, and the composition of the material may be identified by XRD.

The MCM-41 is a material with an ordered mesoporous structure, and its chemical composition is mainly silicon dioxide ($SiO_2$), excluding metal elements such as potassium (K), aluminum (Al), and sodium (Na). In some embodiments, other elements, such as metal cations or organic molecules, may be introduced during the synthesis of MCM-41 to alter its physical and chemical properties. Elements like potassium, aluminum, and sodium may be introduced into the MCM-41 through methods such as co-doping or surface modification. These introduced elements may be located in pores or on the surface of MCM-41, thereby affecting its adsorption and other properties. The introduction of these elements facilitates the formation of other metal fluorides, such as NaK2AlF6, with fluoride ions under hydrothermal reaction conditions. $NaK_2AlF_6$ serves as a characteristic identification phase for constructing a fluorine-containing passivation layer of perovskite quantum dots through a hydrothermal reaction, resulting in a similar Morse code.

In some embodiments, $NaK_2AlF_6$ is not the only characteristic identification phase. By introducing different metal elements into the microporous/mesoporous template or perovskite nanocrystals, different characteristic identification phases may be formed, such as $SrF_2$, $CaF_2$, etc.

One or more embodiments of the present disclosure provide a preparation method for perovskite quantum dots, which comprises the following steps:

S1, preparing perovskite nanocrystals.

The precursor of the perovskite nanocrystals with a microporous/mesoporous template is mixed to obtain a mixture. The mixture under a condition below a collapse temperature of the microporous/mesoporous template is calcined to generate the perovskite nanocrystals within pores of the microporous/mesoporous template.

S2, treating after a hydrothermal method.

The perovskite nanocrystals obtained in Step S1 is dispersed into a high-pressure reaction device filled with an inorganic fluoride solution, and the mixed solution is treated by the hydrothermal method to obtain perovskite quantum dots with a fluorine-containing passivation layer.

In some embodiments, the precursor of the perovskite nanocrystals may include a $CsPbX_3$ perovskite nanocrystal precursor, which consists of a Cs source precursor, a Pb source precursor, and a halogen source precursor.

In some embodiments, the Cs source precursor may include one or more of cesium halide and cesium carbonate.

In some embodiments, the Pb source precursor may include one or more of lead halide and lead acetate.

In some embodiments, the halogen source precursor may include one or more of cesium halide, lead halide, zinc halide, potassium halide, sodium halide, lithium halide, ammonium halide, calcium halide, strontium halide, and barium halide.

In some embodiments, the choice of halogen source precursors may include both bromine and iodine sources, forming a $CsPbBr_{3-y}I_y$ perovskite structure. In some embodiments, different amounts of bromine and iodine sources may be selected to adjust the emission wavelength of the quantum dots. The protection of perovskite nanocrystals in the present disclosure includes perovskite structures such as $CsPbBr_3$, $CsPbI_3$, and $CsPbB_{ry}I_{3-y}$.

In some embodiments, the inorganic fluoride solution may include aqueous solutions of NaF, KF, LiF, CsF, and combinations thereof.

In some embodiments, a hydrothermal reaction temperature range in Step S2 is between 150° C. and 250° C. Under high-temperature and high-pressure conditions of the hydrothermal reaction, it is beneficial for the bonding of strongly negatively charged fluoride ions and strongly positively charged metal ions to occur. For example, a pressure range of the hydrothermal reaction is between 1 and 100 MPa. In some embodiments, the hydrothermal reaction temperature range and pressure range in Step S2 may also be other values, which may be set according to actual needs.

In some embodiments, the high-pressure reaction device in Step S2 is a high-pressure reaction kettle, etc.

In some embodiments, a calcination temperature of the perovskite nanocrystal precursor and the microporous/mesoporous template is less than a calcination temperature threshold. The calcination temperature threshold may be set according to actual needs, for example, 600° C. By keeping the calcination temperature below the calcination temperature threshold, the pore structure of the microporous/mesoporous template may be preserved without collapsing.

In the process of preparing perovskite quantum dot materials with a fluorine-containing passivation layer, the maximum calcination temperature adopted in the present disclosure should be such that it may ensure the pores of the microporous/mesoporous material do not collapse. The collapse temperature varies for different microporous/mesoporous materials, and even materials with the same structure may have different collapse temperatures. To achieve optimal results, the calcination temperature must not exceed the lowest collapse temperature of the material. For example, among the microporous/mesoporous materials mentioned above, the lowest collapse temperature is 300° C. In some embodiments, temperatures between 300° C. and 2000° C. may cause most commonly used microporous/mesoporous materials to collapse. For example, mesoporous silica collapses at 600° C., and mesoporous titania begins to collapse at 800° C.

The term "calcination below the collapse temperature of the microporous/mesoporous template" as defined in the present disclosure should also include scenarios where fluxing agents are used. It should be noted that even with the addition of fluxing or collapsing agents, the calcination temperature for preparing perovskite nanocrystals in the present disclosure still needs to be "below the collapse temperature of the microporous/mesoporous template" to preserve the pores.

The potential benefits of the embodiments in the present disclosure include, but are not limited to:

1. In some embodiments of the present disclosure, the microporous/mesoporous template remains open to preserve nanopores. For example, an ion diameter of F ions is approximately 0.26 nm, which is much smaller than the nanopores of the mesoporous template (e.g., pore diameters are typically greater than 2 nm). Therefore, the F ions may effectively accumulate inside the microporous/mesoporous template.
2. In some embodiments of the present disclosure, the F ions have strong electronegativity and may bond with unpaired metal ions (such as barium ions) on the surface of the perovskite, achieving the effect of blocking and passivating the perovskite surface.
3. The perovskite quantum dots easily react with water, which can reduce their luminescent properties. Therefore, there is a common technical prejudice in the field of perovskite display and luminescence research that "water needs to be completely isolated during the preparation of perovskite." In some embodiments of the present disclosure, spontaneous generation of lead hydroxide compounds such as PbBrOH, which have good water and oxygen barrier properties, occurs when perovskite nanocrystals are exposed to water. However, their chemical stability gradually deteriorates at temperatures above 70° C. Before the lead hydroxide coating layer, such as PbBrOH, fails, the F ions are given time to effectively accumulate within the pores of the microporous/mesoporous template. By gradually increasing the temperature to above 70° C. using the hydrothermal method, and utilizing the high-temperature and high-pressure environment provided by the high-pressure reaction device to destroy the lead hydroxide coating layer, such as PbBrOH, the F ions that have already entered the microporous/mesoporous template may form bonds with unpaired, strongly positively charged metal ions (such as Ba ions) on the perovskite surface, achieving the effect of blocking and passivating the perovskite surface.

EMBODIMENT

Step S1, 5 mmol of CsBr, 5 mmol of PbBr2, 1 mmol of BaBr2, and 2 g of MCM-41 molecular sieve were ground and mixed until uniform. The mixed powder was placed in a muffle furnace, heated from room temperature to 450° C., maintained at that temperature for 120 minutes, and then naturally cooled down to room temperature before the sample powder was removed.

Step S2, 300 mg of the calcined powder was dispersed in 30 ml of 3 mol/L KF solution. The mixed solution was placed in a 50 ml high-pressure reactor and heated at 180° C. for 10 hours. Afterward, it was naturally cooled down to room temperature, resulting in CsPbBr3 perovskite quantum dots with a fluorine-containing passivation layer.

Experimental analysis was conducted: The final product from the above preparation process (sample A in FIG. 3) was taken, and its stability was tested in a high-temperature environment of 100° C. and under intense blue light irradiation (350 mW/cm2). The results are presented in Table 1. This table compares the stability test outcomes of samples from various embodiments (including comparative examples). As indicated in Table 1, after 100 hours of high-temperature storage, the luminescence intensity of the powder retained 84% of its initial luminescence intensity. Similarly, after 100 hours of continuous blue light irradiation, the powder maintained 76% of its initial luminescence intensity. In contrast, the powder sample obtained solely through high-temperature calcination (refer to Comparative Embodiment 1) lost significant luminescence intensity, retaining only 20% and 33% of its initial luminescence after the same conditions of high-temperature storage and blue light irradiation for 100 hours. These findings demonstrate that the use of KF solution in hydrothermal treatment enhances the stability of perovskite quantum dots.

Figure 2:
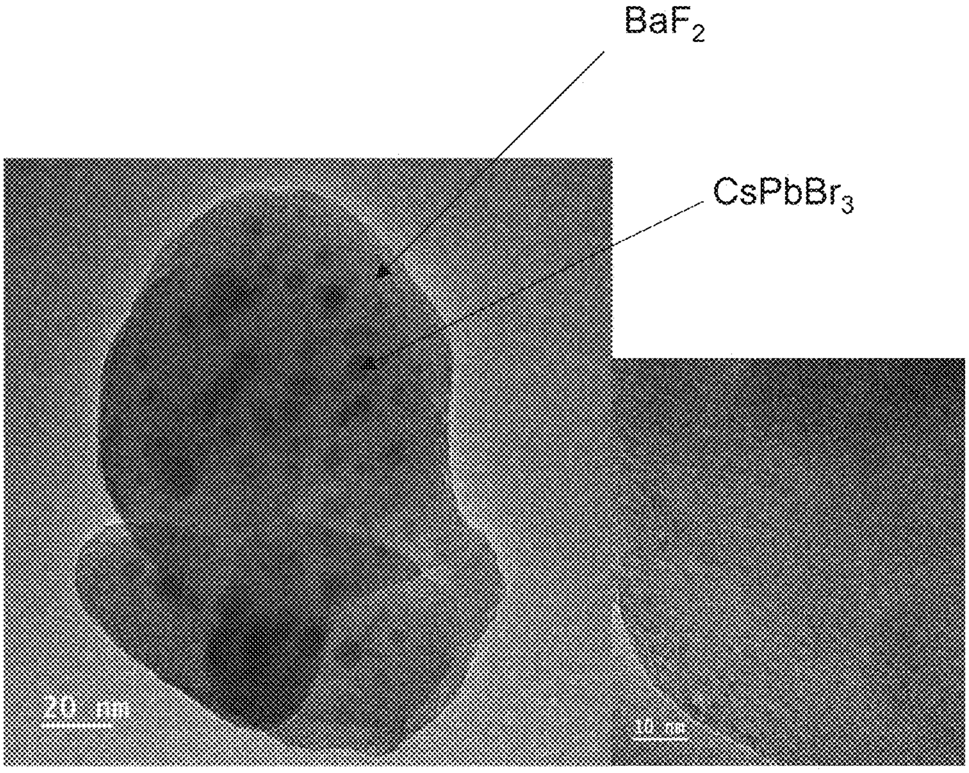
FIG. 2 is a test diagram illustrating the aberration-corrected transmission electron microscopy (AC-TEM) of the perovskite quantum dots produced in embodiment 1.

FIG. 2 is a test diagram illustrating the aberration-corrected transmission electron microscopy (AC-TEM) of the perovskite quantum dots produced in embodiment 1. Perovskite nanocrystals are embedded in the lattice of the fluorine-containing passivation layer, creating a passivated interface between the fluorine-containing passivation layer and the perovskite nanocrystals. As shown in FIG. 2, CsPbBr3 is coated with BaF2. Analysis of the data in Table 1 reveals that the fluorine-containing passivation layer may passivate surface defects of the perovskite nanocrystals, thereby enhancing their stability.

Figure 3:
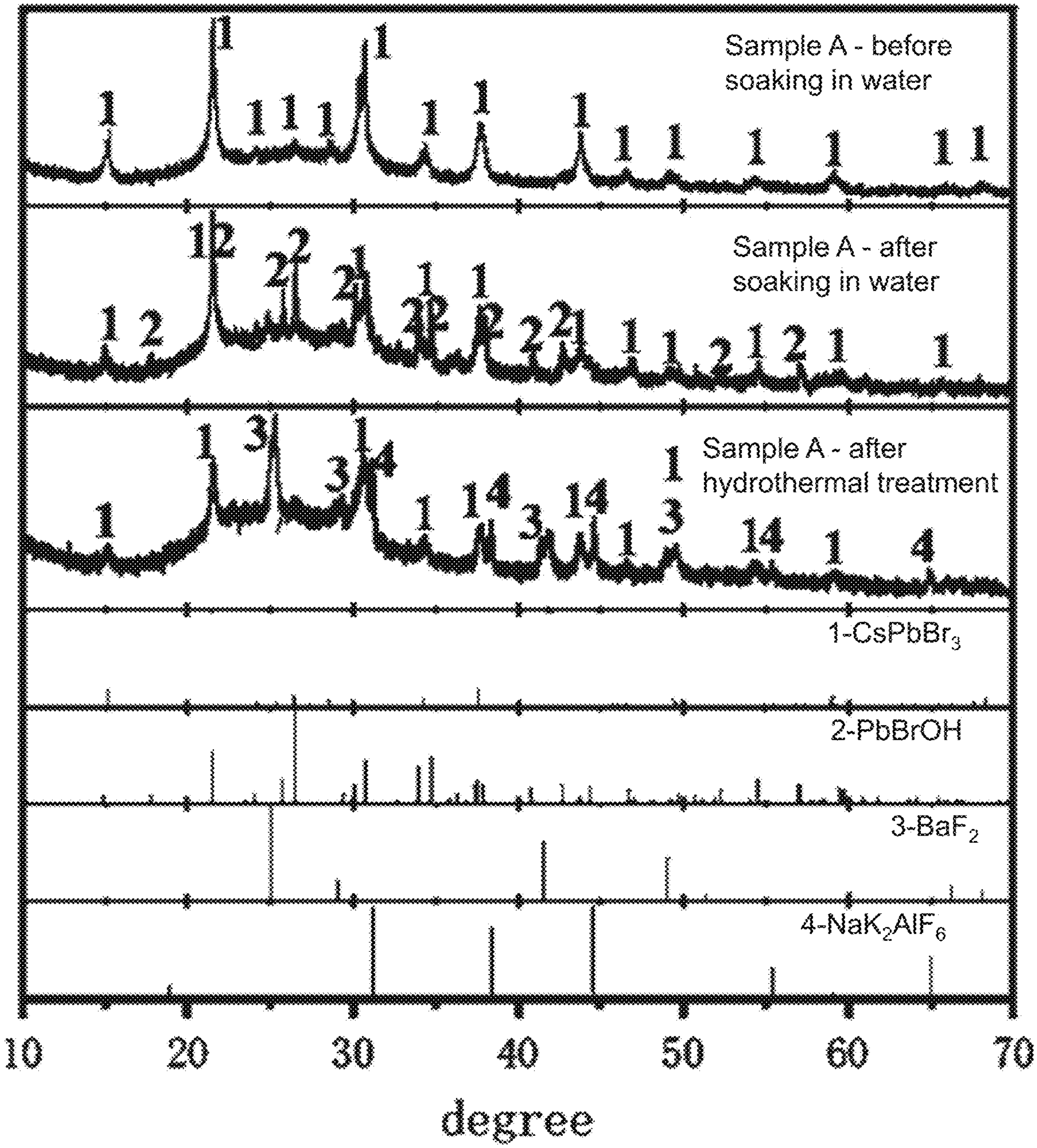
FIG. 3 is an XRD diagram measured at various stages of the perovskite quantum dots in embodiment 1.

FIG. 3 is an XRD diagram measured at various stages of the perovskite quantum dots in embodiment 1.

As shown in FIG. 3, Sample A before soaking in water only contained $CsPbBr_3$ perovskite quantum dots. After soaking in water, Sample A included CsPbBr3 perovskite quantum dots and a PbBrOH lead hydroxide coating. After hydrothermal treatment, Sample A contained $CsPbBr_3$ perovskite quantum dots, a $BaF_2$ passivation layer, and the characteristic recognition phase $NaK_2AlF_6$, but the PbBrOH lead hydroxide coating disappeared.

In Embodiment 1, the MCM-41 molecular sieve selected contains sodium, potassium, and aluminum ions, which are introduced during the doping, modification, or synthesis stages to construct the characteristic recognition phase $NaK_2AlF_6$.

Embodiment 2

The Embodiment 2 demonstrated that other microporous/mesoporous templates are also applicable in the present disclosure.

The difference between Embodiment 2 and Embodiment 1 is that mesoporous silica nanoparticles were used as the microporous/mesoporous template.

Experimental analysis: The final product from the above preparation process was taken, and its stability was tested in a high-temperature environment of 100° C. and under intense blue light irradiation (350 mW/cm2). The results are presented in Table 1. After 100 hours of high-temperature storage, the luminescence intensity of the powder retained 76% of its initial luminescence intensity. Similarly, after 100 hours of continuous blue light irradiation, the powder maintained 70% of its initial luminescence intensity. In contrast, the powder sample obtained solely through high-temperature calcination (refer to Comparative Embodiment 2) lost significant luminescence intensity, retaining only 51% and 27% of its initial luminescence after the same conditions of high-temperature storage and blue light irradiation for 100 hours.

Figure 4:
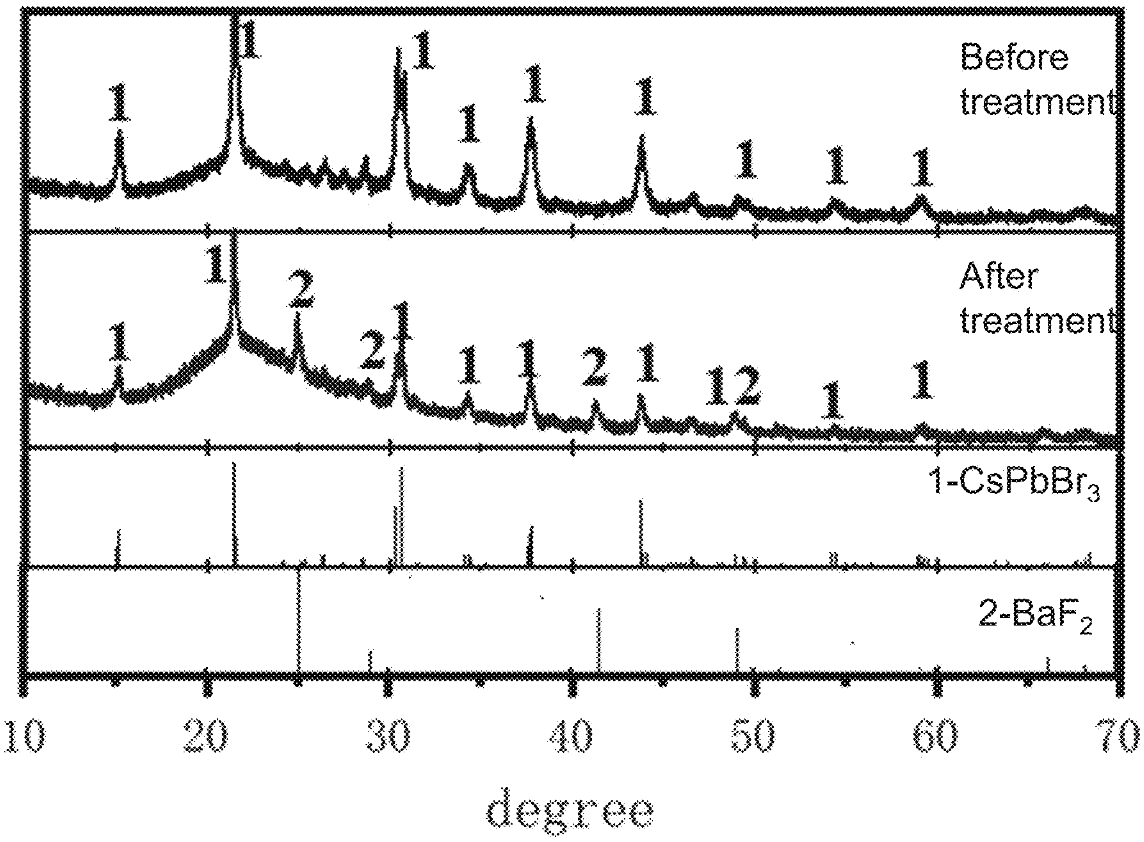
FIG. 4 is an XRD diagram measured at various stages of the perovskite quantum dots in embodiment 2.

FIG. 4 is an XRD diagram measured at various stages of the perovskite quantum dots in embodiment 2. In FIG. 4, "before treatment" refers to before hydrothermal treatment, and "after treatment" refers to after hydrothermal treatment. As can be seen from FIG. 4, mesoporous silica nanoparticles were used as the microporous/mesoporous template. However, since no metal ions were introduced into the mesoporous silica nanoparticles during the doping, modification, or synthesis stages, there was no characteristic recognition phase present in the product after hydrothermal treatment.

Embodiment 3

Step S1, 5 mmol of CsBr, 2.5 mmol of PbBr2, 2.5 mmol of PbI2, 1 mmol of BaBr2, and 2 g of MCM-41 molecular sieve were ground and mixed uniformly. The mixed powder was placed in a muffle furnace, heated from room temperature to 450° C., and continuously heated at 450° C. for 120 minutes, then naturally cooled to room temperature before removing the sample powder.

Step S2, 300 mg of the calcined powder was dispersed in 30 ml of a 3 mol/L KF solution. The mixed solution was placed in a 50 ml high-pressure reaction kettle and heated continuously at 180° C. for 10 hours, then naturally cooled to room temperature to obtain CsPbBr1.5I1.5 perovskite quantum dots with a fluorine-containing passivation layer.

Experimental analysis: The final product from the above preparation process was taken and tested for stability in a high-temperature environment of 100° C. and under intense blue light irradiation (350 mW/cm2). See Table 1 for details. After 100 hours of high-temperature storage, the luminescence intensity of the powder retained 87% of its initial luminescence intensity. Similarly, after 100 hours of continuous blue light irradiation, the powder maintained 81% of its initial luminescence intensity.

Embodiment 4

This embodiment demonstrates that other inorganic fluoride solutions, such as NaF, CsF, and LiF, may also enhance the stability of perovskite luminophores during the hydrothermal treatment stage.

The difference between Embodiment 4 and Embodiment 1 is that NaF, CsF, and LiF were used respectively during the hydrothermal treatment stage, and the concentration and dosage of these fluoride solutions remained the same as in Embodiment 1.

Experimental analysis: The final products from the above preparation processes were taken and tested for stability in a high-temperature environment of 100° C. and under intense blue light irradiation (350 mW/cm2). For the NaF hydrothermal treatment sample, the luminescence intensity retained 85% of its initial intensity after 100 hours of high-temperature storage and 70% after 100 hours of continuous blue light irradiation. For the CsF hydrothermal treatment sample, the luminescence intensity retained 83% after high-temperature storage and 77% after blue light irradiation. For the LiF hydrothermal treatment sample, the luminescence intensity retained 89% after high-temperature storage and 71% after blue light irradiation. These results demonstrate that the use of solutions such as NaF, CsF, and LiF in hydrothermal treatment may enhance the stability of perovskite luminophores.

Comparative Embodiment 1

5 mmol of CsBr, 5 mmol of PbBr2, and 2 g of MCM-41 molecular sieve were ground and mixed uniformly.

The mixed powder described above was placed in a muffle furnace, heated from room temperature to 450° C., continuously heated at 450° C. for 120 minutes, then naturally cooled to room temperature before the sample powder was removed.

Experimental Analysis: The final product from the above preparation process was taken, and its stability was tested in a high-temperature environment of 100° C. and under intense blue light irradiation (350 mW/cm2). See Table 1 for details. After 100 hours of high-temperature storage, the luminescence intensity of the powder could maintain 20% of its original intensity. Similarly, after 100 hours of continuous blue light irradiation, the powder maintained 33% of its original luminescence intensity.

Comparative Embodiment 2

5 mmol of CsBr, 5 mmol of PbBr2, and 2 g of mesoporous silica nanoparticles were ground and mixed uniformly.

The procedure described in Comparative Embodiment 1 was followed for heating and cooling the mixed powder.

Experimental Analysis: Similar to Comparative Embodiment 1, the final product was tested for stability. After 100 hours of high-temperature storage, the luminescence intensity retained 51% of its original intensity, and after 100 hours of blue light irradiation, it retained 27%.

Comparative Embodiment 3

5 mmol of CsBr, 5 mmol of PbBr2, 1 mmol of BaBr2, and 2 g of MCM-41 molecular sieve were ground and mixed uniformly. The mixed powder was treated as described in Comparative Embodiment 1.

300 mg of the calcined powder was dispersed in 30 ml of a 3 mol/L KF solution and soaked for 10 hours before removing the sample powder.

Experimental Analysis: Following the same procedure as before, the final product was tested for stability. After 100 hours of high-temperature storage, the luminescence intensity retained 45% of its original intensity, and after 100 hours of blue light irradiation, it retained 39%.

Comparative Embodiment 4

The procedure described in Comparative Embodiment 3 was followed, omitting the soaking step in the KF solution.

Experimental Analysis: The final product was tested for stability as in previous examples. After 100 hours of high-temperature storage, the luminescence intensity retained 26% of its original intensity, and after 100 hours of blue light irradiation, it retained 35%.

TABLE 1

Comparison of stability test results for samples from different embodiments (comparative embodiments)

| Embodiment (or comparative embodiment) | Whether to adopt hydrothermal treatment (type of hydrothermal solution) | The percentage of luminescence intensity of the powder compared to the initial luminescence intensity after 100 hours of high-temperature storage | The percentage of luminescence intensity of the powder compared to the initial luminescence intensity after 100 hours of blue light irradiation |
|---|---|---|---|
| Embodiment 1 | Yes | 84% | 76% |
| Embodiment 2 | Yes | 76% | 70% |
| Embodiment 3 | Yes | 87% | 81% |
| Embodiment 4 (NaF) | Yes | 85% | 70% |
| Embodiment 4 (CsF) | Yes | 83% | 77% |
| Embodiment 4 (LiF) | Yes | 89% | 71% |
| Comparative embodiment 1 | No | 20% | 33% |
| Comparative embodiment 2 | No | 51% | 27% |
| Comparative embodiment 3 | No | 45% | 39% |
| Comparative embodiment 4 | No | 26% | 35% |

The embodiments described above provide detailed explanations of the preparation scheme outlined in the present disclosure. It should be understood that these examples are intended solely for the purpose of illustrating the present disclosure and do not serve to limit its scope. Any modifications, additions, or substitutions made within the principles outlined in the present disclosure shall be included within its protective scope.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term “about,” “approximate,” or “substantially”. Unless otherwise stated, “about,” “approximate,” or “substantially” may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

With respect to each patent, patent application, patent application disclosure, and other material cited in the present disclosure, such as articles, books, manuals, publications, documents, etc., the entire contents thereof are hereby incorporated by reference into the present disclosure. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A perovskite quantum dot with a fluorine-containing passivation layer, comprising an incompletely closed microporous/mesoporous template, with perovskite nanocrystals and a fluorine-containing passivation layer growing in pores of the microporous/mesoporous template, the fluorine-containing passivation layer being used to passivate surface defects of the perovskite nanocrystals; wherein the fluorine-containing passivation layer includes $BaF_2$.

2. The perovskite quantum dot with the fluorine-containing passivation layer according to claim 1, wherein the fluorine-containing passivation layer includes $BaF_2$ and other metal fluorides;

the other metal fluorides refer to metal fluorides other than $BaF_2$.

3. The perovskite quantum dot with the fluorine-containing passivation layer according to claim 2, wherein when the microporous/mesoporous template is MCM-41, the fluorine-containing passivation layer includes $BaF_2$ and $NaK_2AlF_6$.

4. The perovskite quantum dot with the fluorine-containing passivation layer according to claim 1, wherein the microporous/mesoporous template is a microporous material and/or a mesoporous material;

the microporous material being at least one of microporous molecular sieve, microporous silica, microporous titania, microporous alumina, microporous transition metal oxide, microporous sulfide, microporous silicate, microporous aluminate, or microporous transition metal nitride;

the mesoporous material being at least one of mesoporous molecular sieve, mesoporous silica, mesoporous titania, mesoporous alumina, mesoporous carbon, mesoporous transition metal oxide, mesoporous sulfide, mesoporous silicate, mesoporous aluminate, or mesoporous transition metal nitride.

5. The perovskite quantum dot with the fluorine-containing passivation layer according to claim 1, wherein the perovskite nanocrystals have a perovskite structure $ABX_3$, wherein a molar ratio of A, B, and X is 1:1:3, and A is Cs, B is Pb, Sn, or Cu, and X is Cl, Br, or I.

6. The perovskite quantum dot with the fluorine-containing passivation layer according to claim 1, wherein the perovskite nanocrystals have a perovskite structure $ABX_{1.5}X'_{1.5}$, wherein a molar ratio of A, B, X, and X' is 1:1:1.5:1.5, and A is Cs, B is Pb, Sn, or Cu, and X and X' are different and independently Cl, Br, or I.

7. The perovskite quantum dot with the fluorine-containing passivation layer according to claim 1, wherein a melting point of the fluorine-containing passivation layer is higher than a melting point of the perovskite nanocrystals.

8. The perovskite quantum dot with the fluorine-containing passivation layer according to claim 7, wherein there is a passivation interface between the fluorine-containing passivation layer and the perovskite nanocrystals.

9. The perovskite quantum dot with the fluorine-containing passivation layer according to claim 8, wherein the perovskite nanocrystals are embedded in the lattice of the fluorine-containing passivation layer; or, some of the perovskite nanocrystals are coated by the fluorine-containing passivation layer.

10. A method for constructing a fluorine-containing passivation layer for perovskite quantum dots, comprising:

growing perovskite nanocrystals containing barium within pores of a microporous/mesoporous template, wherein the microporous/mesoporous template is not fully pore-closed;

soaking the microporous/mesoporous template grown with the perovskite nanocrystals containing barium in water to form a lead hydroxide coating on the surface of the perovskite nanocrystals containing barium;

introducing F ions into the pores of the microporous/mesoporous template to enrich the F ions within the pores, wherein the lead hydroxide coating blocks contact between the F ions and the perovskite nanocrystals containing barium;

placing the microporous/mesoporous template containing the perovskite nanocrystals with barium, the lead hydroxide coating, and the enriched F ions under a hydrothermal reaction condition; wherein during the hydrothermal reaction, the lead hydroxide coating disappears and a fluorine-containing passivation layer is formed on the surface of the perovskite nanocrystals, the fluorine-containing passivation layer including BaF2.

11. The method of claim 10, wherein:

the fluorine-containing passivation layer further includes other metal fluorides, the other metal fluorides serving as characteristic identification phases for constructing the fluorine-containing passivation layer of perovskite quantum dots through the hydrothermal reaction.

12. The method of claim 11, wherein:

when the microporous/mesoporous template is MCM-41, the fluorine-containing passivation layer includes $BaF_2$ and $NaK_2AlF_6$.

13. The method of claim 10, wherein:

the microporous/mesoporous template is a microporous material and/or a mesoporous material;

the microporous material being at least one of microporous molecular sieve, microporous silica, microporous titania, microporous alumina, microporous transition metal oxide, microporous sulfide, microporous silicate, microporous aluminate, or microporous transition metal nitride;

the mesoporous material being at least one of mesoporous molecular sieve, mesoporous silica, mesoporous titania, mesoporous alumina, mesoporous carbon, mesoporous transition metal oxide, mesoporous sulfide, mesoporous silicate, mesoporous aluminate, or mesoporous transition metal nitride.

14. The method of claim 10, wherein:

the perovskite nanocrystals have a perovskite structure $ABX_3$, wherein a molar ratio of A, B, and X is 1:1:3, and A is Cs, B is Pb, Sn, or Cu, and X is Cl, Br, or I.

15. The method of claim 10, wherein:

the perovskite nanocrystals have a perovskite structure $ABX_{1.5}X'_{1.5}$, wherein a molar ratio of A, B, X, and X' is 1:1:1.5:1.5, and A is Cs, B is Pb, Sn, or Cu, and X and X' are different and independently Cl, Br, or I.

16. The method of claim 10, wherein:

a melting point of the fluorine-containing passivation layer is higher than a melting point of the perovskite nanocrystals.

17. The method of claim 16, wherein:

there is a passivation interface between the fluorine-containing passivation layer and the perovskite nanocrystals.

18. The method of claim 17, wherein:

the perovskite nanocrystals are embedded in the crystal lattice of the fluorine-containing passivation layer; or a portion of the perovskite nanocrystals is coated by the fluorine-containing passivation layer.

* * * * *